Aug. 9, 1955  A. R. WOOD ET AL  2,715,021
CARBURETOR

Filed Oct. 17, 1952  3 Sheets-Sheet 1

Inventors
A. R. Wood
N. R. Wood

By
Henderoth, Lind & Ponack
Attorneys.

Aug. 9, 1955     A. R. WOOD ET AL     2,715,021

CARBURETOR

Filed Oct. 17, 1952     3 Sheets-Sheet 3

Inventors
A. R. Wood
N. R. Wood
By Shenderoth, Lind & Ponack
Attorneys.

United States Patent Office 2,715,021
Patented Aug. 9, 1955

2,715,021

CARBURETOR

Alexander Rigby Wood, Ashfield, New South Wales, and Noel Raymond Wood, Drummoyne, New South Wales, Australia, assignors of one-third to Frank Edward Fanning, Spreydon, Christchurch, New Zealand Application October 17, 1952, Serial No. 315,357

Claims priority, application Australia October 22, 1951

4 Claims. (Cl. 261—56)

This invention relates to an improved carburetor construction.

The object of the invention is to provide a carburetor which is relatively simple in construction and operation, which eliminates the need for a choke, which does not employ jets and which vapourises liquid fuel in a more efficient manner than existing carburetors.

According to the present invention a carburetor for internal combustion engines comprises an aeration chamber, means for controlling the level of liquid fuel in the aeration chamber, an aeration unit fitted within the aeration chamber and comprising first air inlet means lying below the level of liquid fuel and second air inlet means lying partly below and partly above the liquid fuel level, an outlet for fuel-air mixture above the liquid fuel level, and air inlet means positioned in the upper part of the aeration chamber between the liquid fuel level and the outlet.

The invention will be better understood by reference to a preferred form shown in the accompanying drawings in which:

Fig. 4 is shown displaced a short distance vertically from its normal position within Fig. 5.

Figure 1:
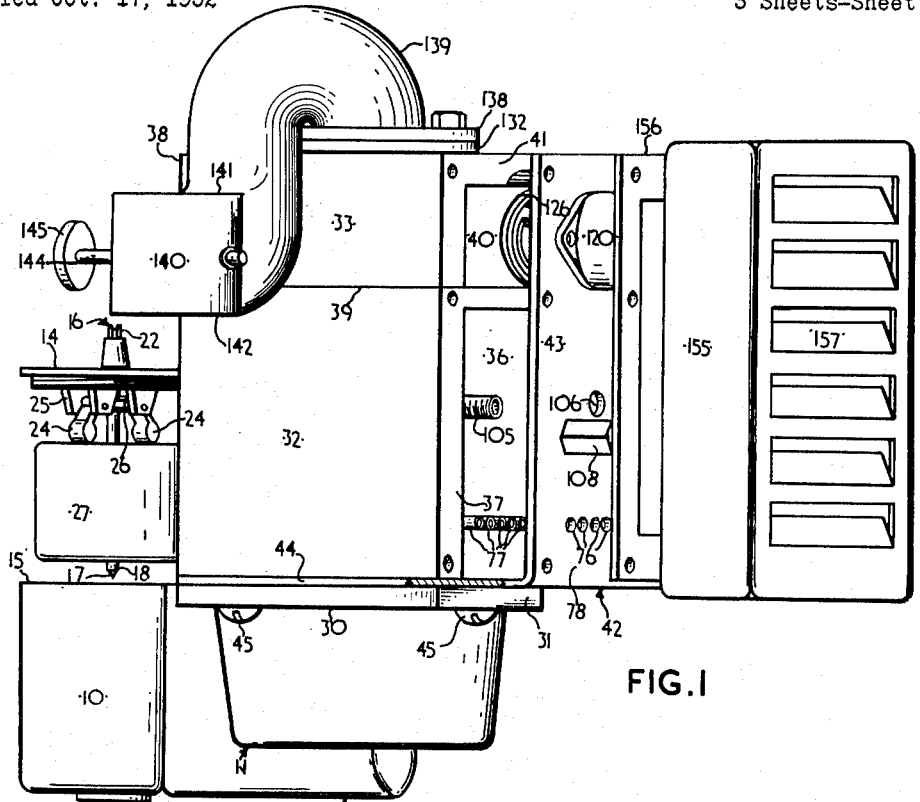
Fig. 1 is a side elevation of the complete unit with some detachable parts shown exploded from their normal positions.
Figure 2:
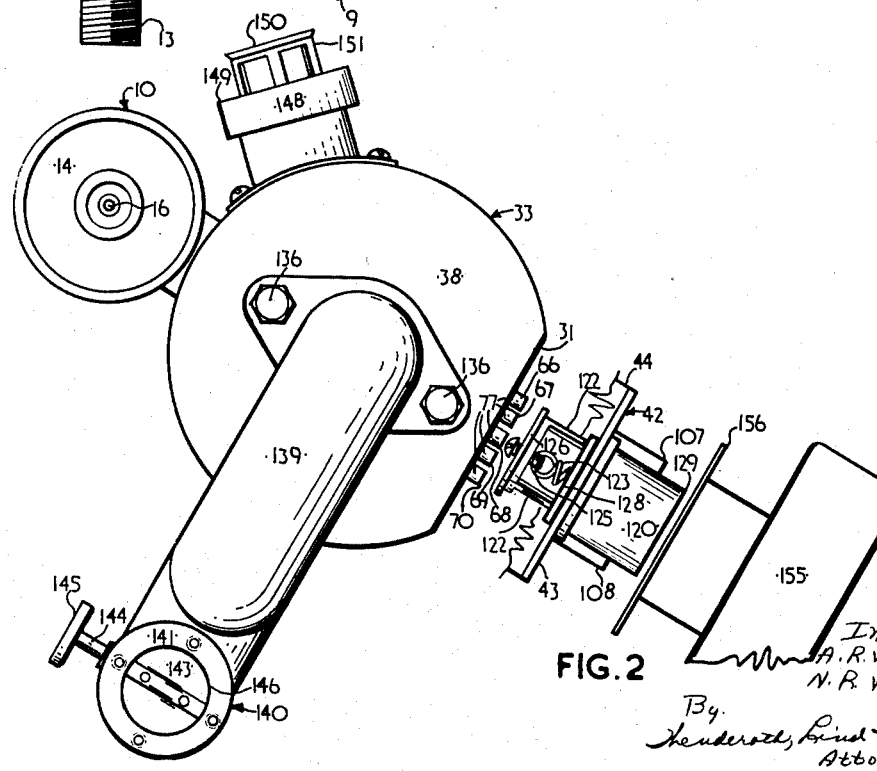
Fig. 2 is a plan view of the unit shown in Fig. 1.

The lower portion of the carburetor consists of a casting 9 in which are formed two cylindrical float chambers 10 and 11 connected by a passage 12. An externally threaded and internally bored boss 13 is formed integrally and medially with, and dependent from, the underside of the float chamber 10.

A fuel supply line can be connected to the boss 13 to fill the float chambers. An externally threaded and flanged disc-shaped cover 14 is screwed into the upper open end 15 of the float chamber 10. A vertically disposed needle valve rod 16 is slidably mounted in a medial bore in the cover 14. A conical face 17 is formed in the lower extremity 18 of the rod 16, the lower extremity 18 being free to slide within a medial counterbore 19 in a valve insert 20 located within the float chamber 10, and which is in threaded engagement with the bore formed within the boss 13. When the rod 16 is in its lowest position the conical face 17 makes contact with the upper end of a small diameter bore 21 in the insert 20 to shut off the fuel supply. Two opposed weighted lever arms 24 are pivoted near their unweighted ends between lugs 25 formed integrally with the underside of the cover 14 so that the arms 24 can rotate in a common vertical plane. The unweighted ends of the arms 24 are located between the flanges of a double flanged circular striking plate 26 which is rigidly but detachably mounted on the rod 16 adjacent to the underside of the cover 14.

A hollow cylindrical float 27 is carried within the float chamber 10 and is provided with an integral longitudinal central tube 28 within which the rod 16 is free to slide. As fuel enters the float chamber 10, the float 27 rises, its upper surface striking the weighted ends of the arms 24 which cause the rod 16 to be forced down into the valve insert 20 to shut off the fuel supply. The fuel level is thereby maintained at the level indicated by the line 29.

A flange 30 is formed integrally with the casting 9 adjacent to the upper open end of the float chamber 11, and a segment of this circular flange 30 is cut away at a point directly opposite the float chamber 10 to form a flat face 31.

A hollow cylindrical casting 32 having an open lower end 34 and a closed upper end 35 has an external diameter equal to that of the flange 30 and also has portion of its curved surface cut to correspond with the face 31, thereby forming a face 37, and a rectangular opening 36.

A similar but shorter hollow cylindrical casing 33, corresponding in all respects to the casing 32, has an open end 39, a closed end 38, an opening 40 and face 41, and is secured in airtight fashion by its lower end 39 to the end 35 of the casing 32.

A comparatively thin face plate 42 comprises a circular portion 44 and a rectangular portion 43 at right angles to each other. The rectangular portion 43 is secured in airtight fashion to the faces 41 and 37 of the casings 33 and 32 respectively, whilst the circular portion 44 mates with the lower end 34 of the casing 32.

The casings 32 and 33 and cover plates 42 are secured in airtight fashion to the flange 30 of the casting 9 by the round headed screws 45.

The central portion of the lower part 44 of the cover plate 42 is cut away to form a ring of internal circumference 46 equal to the internal circumference of the upper open end 47 of the float chamber 11. Five lugs 48, 49, 50, 51 and 52 project inwardly from the circumference 46 and are secured to the outer curved surface 53 of a short cylindrical open ended ring 54 so as to locate it concentrically with, and in the same plane as, the lower part 44 of the cover plate 42.

A solid cylindrical pillar 55 with its longitudinal axis vertical is secured by integral lugs 56 and 57 to the lower edge of the ring 54. A rectangular slot 58 is formed in the lower end of the pillar 55 below the ring 54 and weighted arms 61, similar to the arms 24, are pivoted therein to operate a striker plate 62 and needle valve rod 60 which is free to slide in a short central bore 59 in the pillar 55. The lower end 63 of the valve rod 60 is free to slide in a valve seat insert 64 which is in threaded engagement with a bore in the centre of the floor of the float chamber 11, and which communicates with the passage 12. A float 65, operating in a similar manner to the float 27, actuates the valve rod 60 so as to maintain the level of fuel in the chamber 11 at the level indicated by the line 29.

The open ends 77 of five aeration tubes 66, 67, 68, 69 and 70 are secured in airtight fashion in holes 76 near the lower end 78 of the vertical portion 43 of the cover plate 42. The tube 66 comprises a horizontal portion 79 which is bent at right angles to pass through the lug 48, and a portion 80 extending vertically to the floor 81 of the float chamber 11 and lastly an arcuate portion 74 with a blanked end extending around portion of the periphery of the floor 81 of the float chamber 11. The tube 67 passes in a similar manner through the lug 49 to an arcuate blanked end 73. The tubes 68, 69 and 70 pass through lugs 52, 51 and 50 and terminate in arcuate portions 74, 72 and 71 respectively. The surface of each arcuate portion 71, 72, 74, 75 and 73, which faces towards the centre of the float chamber 11 is bored with a number of small holes 82.

The upper end 83 of the pillar 55 is extended to form an integral hollow tubular shank 85 with an open upper end 84.

A cylindrical neck ring 86 having an internal bore 87 and an internal annular groove 88 fits over the hollow tube 85 which is provided with holes 89 so that the groove 88 communicates with the internal bore of the tube 85.

The neck ring 86 is retained on the shank 85 by a nut 90 secured on an external thread 91. A further five aeration tubes 92, 93, 94, 95, 96, bent at right angles at points approximately midway along their lengths are secured at the extremities of their horizontal legs 97 at points equidistantly spaced around the curved outer face of the neck ring 86 so that the tubes 92, 93, 94, 95 and 96 communicate with the annular groove 88. The vertically dependent legs 98 of said tubes project down into and terminate near the bottom 81 of the float chamber 11, passing between the vertical portions 80 of the tubes 66, 67, 68, 69 and 70. A number of holes 99 of slightly larger diameter than the holes 82 are drilled in each of the dependent legs 98 to face approximately towards the centre of the float chamber 11. The holes 99 are so arranged that the jets of air issuing from adjacent holes cross one another. The extremities of the legs 98 are blanked off.

The vertical leg 101 of an elbow 100 is screwed on to the threaded end 91 of the shank 85, whilst a horizontal leg 103 carries the end 104 of a threaded nipple 102 which is secured in airtight fashion to the vertical portion 43 of the cover plate 42, so that its open end 105 projects beyond the plate 43. The threaded ends 110 of two hexagonal nipples 107 and 108 with blanked ends 108A are screwed into the plate 43 immediately below the nipple 102, and calibrated holes 109 are drilled in each blanked end 108A.

Figure 3:
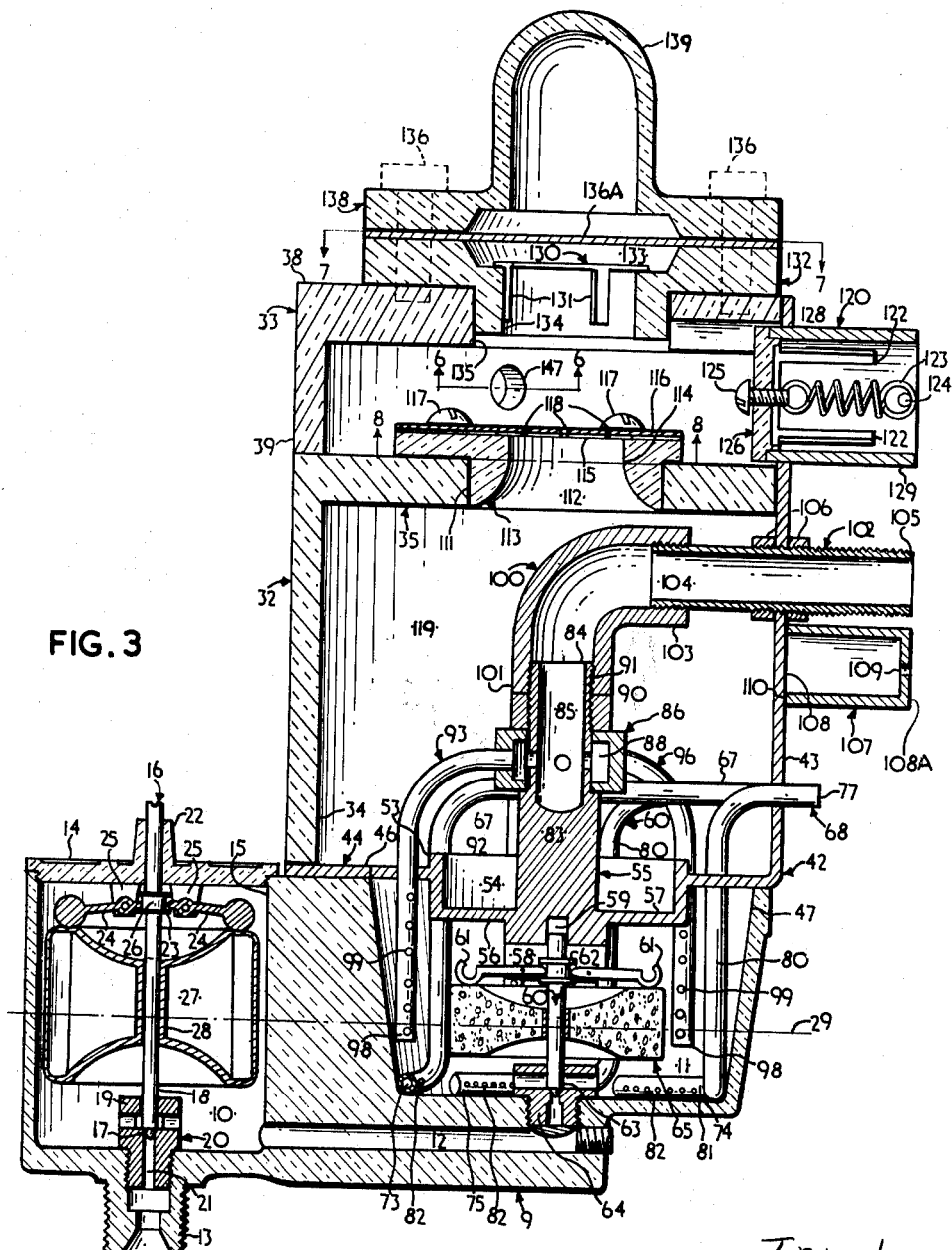
Fig. 3 is a side elevation in half section of the unit but with the air cleaner detached.
Figure 4:
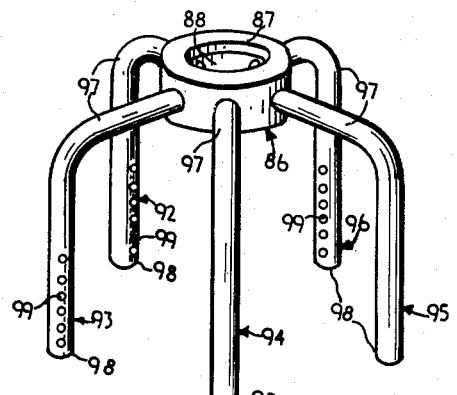
Fig. 4 is a side elevation in perspective of one nest of aeration tubes detached from their seating.
Figure 7:
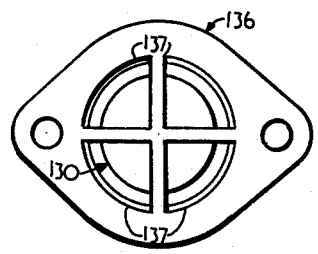
Fig. 7 is a sectional plan view on the line 7—7 in Fig. 3.
Figure 5:
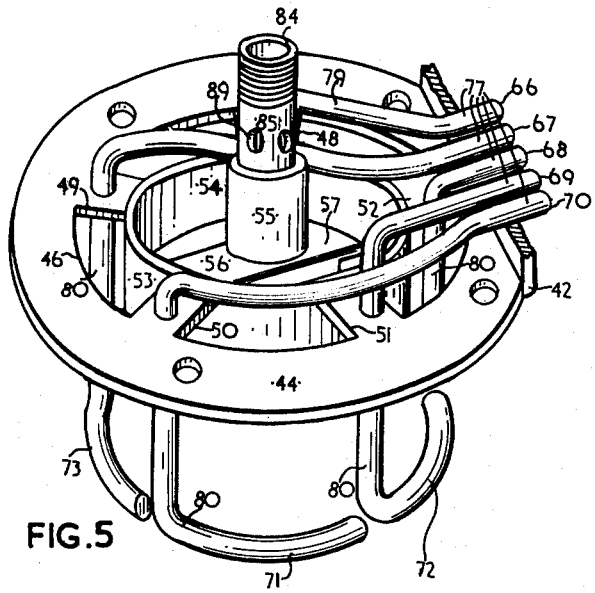
Fig. 5 is a side elevation in perspective of a second nest of aeration tubes and mounting plate.
Figure 6:
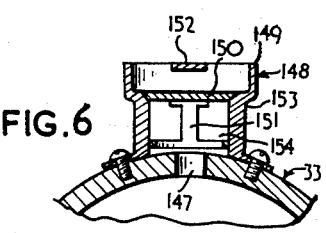
Fig. 6 is a sectional plan view on the line 6—6 in Fig. 3.
Figure 8:
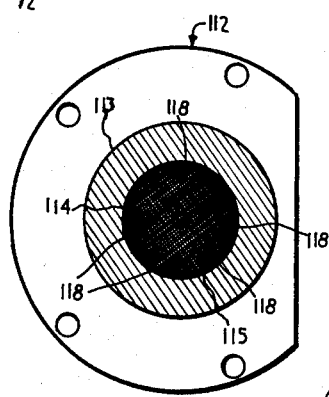
Fig. 8 is a sectional plan view on the line 8—8 in Fig. 3.

The upper blanked end 35 of the casing 32 is provided with an internal bore 111. A flanged neck ring 112 is secured to the upper surface of the end 35 by screws 117 (see Figs. 3 and 8). The ring 112 is provided wth a central bore 114 with a radiused lower extremity 113 facing towards the aeration chamber 119 within the casing 32. A section of filter gauze 115 is clamped also by the screws 117 to the top surface of the neck ring 112 by a cover plate 116 which has five holes 118 bored through its surface adjacent to the bore 114.

A hollow cylinder 120 having open ends 128 and 129 is medially secured in the plate 43 near its end 128 and adjacent to the port 40 in the casing 33. A circular valve disc 126 is located adjacent to the end 128 of the cylinder 120 and carries three integral guide arms 122 which fit slidably within the internal bore of the cylinder 120. A tension spring 123, having one end secured to a pin 124 integral with the end 129 of the cylinder 120 and its remaining end secured to the shank of a set screw 125 carried in threaded engagement with the central bore in the valve disc 126, normally urges the said valve disc 126 against the face 128.

The shank of a flanged neck ring 132 fits into a central bore 135 in the upper end 38 of the casing 33 and is secured thereto in airtight fashion by bolts 136. The upper surface of the ring 132 is provided with a flat bottomed recess 133 in which a non-return valve disc 130 is seated. Integral guide arms 131 slidably locate the disc 130 in the bore 134. A plate 136A is secured to the upper surface of the flanged neck ring 132, which acts as a stop to limit the travel of the valve 130. Four sectors 137 are relieved in the plate adjacent to the top of the valve 130 to allow free passage of air etc.

A flange 138 is also secured to the top of the flange 132 by the bolts 136. A tube integral with the flange 138 leads into the side of an open ended tube 140 disposed with its longitudinal axis vertical and having upper and lower horizontal faces 141 and 142 respectively. A butterfly valve disc 143 is carried in the bore 146 of the tube 140 on a horizontal cross shaft 144 free to rotate within the walls of the tube 140. An operating disc 145 is attached to one end of the shaft 144.

A hole 147 is provided in the wall of the casing 33 to the outer surface of which a hollow cylindrical casing 148 having a flared outer portion 149 is attached. A valve disc 150 contacts a valve seat 153 in the interior of the outer portion 149. An integral relieved valve guide 151 is slidably carried in the bore 154 of the casing 148. A removable bar 152 secured in the outer edges of the outer portion 149 normally limits the outward movement of the valve disc 150.

An air cleaner casing 155 is secured by a flanged extension 156 to the face of the plate 43. The casing 155 contains a suitable air cleaning element, air being admitted through the louvres 157.

In operation the carburetor is fitted to the intake manifold of an engine at either face 141 or 142 of the tube 140 according to adaptability of said engine to an up or down draught carburetor. The unused face 141 or 142 is blanked off. A fuel supply under pressure above atmospheric is connected to the threaded boss 13. Fuel is then admitted to the float chambers 10 and 11 to the level 29. When the engine is turned over air is displaced by its pistons, and a partial vacuum is created within the tube 139 and aeration chamber 119. Outside atmospheric pressure forces air through the air cleaner 155 and into the open bores 77 of the aeration tubes 66, 67, 68, 69, and 70. The air emerges through the holes 82 below the fuel level in jets and whips the fuel into a foam. This foam, comprising bubbles of air and fuel vapour mixture and small liquid particles, rises into the aeration chamber 119. The air entering the aeration chamber 119 in the form of criss-crossed jets from holes 99 aerates the foam further, and further breaks up the small particles of liquid fuel. The air jets entering the chamber 119 through the calibrated holes 109 in the nipples 107 effect the final break up of any remaining liquid fuel particles thereby effecting substantially complete vaporization of the liquid fuel. In fact, above the level of the holes 109 it is not possible to detect any particles of liquid fuel in the fuel vapour-air mixture. The fuel vapour passes through the bore 113, gauze 115 and holes 118 and thence past the valve disc 130, which is maintained raised off its seat by the pressure gradient between its upper and lower surfaces. The vapour then passes through the tube 139 to the engine.

At higher engine speeds the pressure within the casing 33 drops sufficiently for outside atmospheric pressure to force the valve disc 126 off its seat 128 against the action of the spring 123 thus admitting additional air and keeping the fuel-air ratio at the optimum figure.

In the event of a back-fire when pressures above atmospheric are felt in the carburetor the safety valve 150 is forced off its seat 153 to relieve this pressure. The action of the valve 130 also minimises the effect of a back-fire.

The needle valve 60 and float 65 maintains the fuel level in the chamber 11 at the level 29. When the engine stops the fuel is prevented from draining out of the chambers 10 and 11 by the needle valve 16.

A carburetor having an aeration spindle as is described above and shown in the accompanying drawings ensures that the liquid fuel is vapourised in an extremely efficient manner. Tests have shown that the fuel consumption of engines fitted with a carburetor constructed in accordance with the present invention is substantially less than the fuel consumption of the same engines when fitted with a normal carburetor.

It will be noted that the carburetor of the present invention is relatively simple in construction and operation. There are no jets to become clogged and the need for a choke is substantially eliminated. Furthermore the more efficient vapourisation of the liquid fuel results in a considerable improvement in the fuel consumption of the engine. It has been found that with the carburetor of the present invention the fuel mixture issuing from the outlet passage is substantially free of any unvaporised liquid fuel.

We claim:

1. A carburetor for internal combustion engines comprising an aeration chamber, means for controlling the level of liquid fuel in the aeration chamber, an aeration unit comprising a central column fitted within the aeration chamber and supporting a first series of aeration tubes leading from the side of the aeration chamber and terminating in an arcuate portion provided with a series of small holes and adapted to lie on the floor of the aeration chamber, a second series of aeration tubes having a series of small holes in the lower end and suspended about and communicating with the interior of the central column which is connected to an air inlet in the side of the aeration chamber, an outlet for fuel-air mixture above the liquid fuel level and a number of nipples fitted in the side of the aeration chamber between the liquid fuel level and the outlet, each nipple having a calibrated air inlet hole.

2. A carburetor for internal combustion engines comprising an aeration chamber, means for controlling the level of liquid fuel in the aeration chamber, an aeration unit fitted within the aeration chamber and comprising first air inlet means lying below the level of liquid fuel and second air inlet means lying partly below and partly above the liquid fuel level, and outlet for fuel-air mixture above the liquid fuel level, air inlet means positioned in the upper part of the aeration chamber between the liquid fuel level and the outlet, a spring loaded disc valve positioned above the aeration chamber to permit entry of additional air at high engine speeds, a backfire valve fitted in the aeration chamber outlet and a gauze filter interposed between the aeration chamber and the outlet and held in position by a perforated cover-plate.

3. A carburetor for internal combustion engines comprising two float chambers, one being connected to a source of liquid fuel and to the other float chamber which forms the lower part of an aeration chamber, an intake manifold feeding of Y-shape to adapt the carburetor to an up or down draught position connected to the aeration chamber outlet, an aeration unit comprising a central column fitted within the aeration chamber and supporting a first series of aeration tubes each leading from the side of the aeration chamber and terminating in an arcuate portion provided with a series of small holes and adapted to lie on the floor of the aeration chamber, a second series of aeration tubes having a series of small holes in the lower end and suspended about and communicating with the interior of the central column which is connected to an air inlet in the side of the aeration chamber, a number of nipples fitted in the side of the aeration chamber between the liquid fuel level and the outlet, each nipple having a calibrated air inlet hole, and a sliding disc valve fitted between the aeration chamber outlet and the intake manifold feeding.

4. A carburetor as claimed in claim 2 wherein the aeration chamber is substantially cylindrical with a flattened face portion on the exterior wall in which the air inlet means and the nipples are secured and an air filter is secured to the flattened face portion around the air inlet means and the nipples.

References Cited in the file of this patent

UNITED STATES PATENTS

| | | |
|---|---|---|
| 156,463 | Marks | Nov. 3, 1874 |
| 174,054 | Allen | Feb. 29, 1876 |
| 1,191,097 | Speirs | July 11, 1916 |
| 1,195,315 | Williams | Aug. 22, 1916 |
| 1,634,022 | Dalton | June 28, 1927 |
| 1,684,902 | Woolson | Sept. 18, 1928 |
| 1,973,713 | Justheim et al. | Sept. 18, 1934 |